US010050831B2

(12) United States Patent
Labrou et al.

(10) Patent No.: US 10,050,831 B2
(45) Date of Patent: Aug. 14, 2018

(54) QUERY LATENCY OF A DNS SERVICE

(71) Applicant: VERISIGN, INC., Reston, VA (US)

(72) Inventors: Yannis Labrou, Washington, DC (US);
Frank Scalzo, Leesburg, VA (US);
Ramakant Pandrangi, Lansdowne, VA (US)

(73) Assignee: VERISIGN, INC., Reston, VA (US)

( * ) Notice: Subject to any disclaimer, the term of this patent is extended or adjusted under 35 U.S.C. 154(b) by 194 days.

(21) Appl. No.: 15/054,894

(22) Filed: Feb. 26, 2016

(65) Prior Publication Data

US 2016/0254955 A1    Sep. 1, 2016

Related U.S. Application Data

(60) Provisional application No. 62/121,343, filed on Feb. 26, 2015.

(51) Int. Cl.
*H04L 12/24* (2006.01)
*H04L 29/12* (2006.01)
*H04L 12/26* (2006.01)

(52) U.S. Cl.
CPC ...... *H04L 41/0816* (2013.01); *H04L 43/0852* (2013.01); *H04L 61/1511* (2013.01); *H04L 61/6004* (2013.01)

(58) Field of Classification Search
CPC . H04L 41/5038; H04L 41/0816; H04L 43/00; H04L 43/08; H04L 43/0864; H04L 43/0852; H04L 43/10; H04L 43/12; H04L 61/1511; H04L 61/6004; H04L 63/1408
USPC ........................................................ 709/221
See application file for complete search history.

(56) References Cited

U.S. PATENT DOCUMENTS

| 7,657,629 B1* | 2/2010 | Kommula | H04L 29/12066 709/226 |
| 2002/0120727 A1 | 8/2002 | Curley et al. | |
| 2011/0270964 A1* | 11/2011 | Huang | H04L 29/12066 709/224 |
| 2011/0320524 A1* | 12/2011 | Nandagopal | H04L 29/12066 709/203 |
| 2015/0025846 A1* | 1/2015 | Klein | G03F 7/70633 702/179 |

(Continued)

FOREIGN PATENT DOCUMENTS

EP    2800343 A1    5/2014

OTHER PUBLICATIONS

Anonymous, "Performance of the DNS Transport Layer", Aug. 27, 2002, XP055370134, URL:http://students.mimuw.edu.pl/SR/prace-mgr/szymaniak/node42.html, 2 pages.

(Continued)

*Primary Examiner* — Ruolei Zong
(74) *Attorney, Agent, or Firm* — Artegis Law Group, LLP

(57) ABSTRACT

Systems, methods, and computer-readable mediums are provided that access a set of data related to a plurality of domain name system (DNS) requests for a plurality of subnets in a network. A subset of the set of data that is a representative sample of the set of data is selected. Latency of the subset of the data is estimated and latency is estimated for the totality of the data. A portion of the network is modified based on the estimated latency of the totality of the data.

15 Claims, 8 Drawing Sheets

(56) References Cited

U.S. PATENT DOCUMENTS

2015/0074221 A1* 3/2015 Kuparinen ........ H04L 29/12066
709/214
2015/0319097 A1* 11/2015 Hyatt ................. H04L 67/1008
709/224

OTHER PUBLICATIONS

Zseby, T., et al., "Sampling and Filtering Techniques for IP Packet Selection", Internet Engineering Task Force, IETF; Internet Society (ISOC) 4, Rue Des Falaises CH-1205 Geneva, Switzerland, vol. psamp, No. 11, Jul. 9, 2008, XP015058802.
Extended European Search Report for Application No. 16157741.6, dated Jul. 20, 2016, 9 pages.
Deb et al., "An improved DNS server selection algorithm for faster lookups", Communication Systems Software and Middleware and Workshops, 2008. COMSWARE 2008. 3rd International Conference on, IEEE, Piscataway, NJ, USA, Jan. 6, 2008 (Jan. 6, 2008), pp. 288-295, XP031279692, ISBN: 978-1-4244-1796-4 * the whole document *.
Liu et al., "Analysis of end-to-end 1-15 DNS quality", Network Infrastructure and Digital Content, 2010 2nd IEEE International Conference on, IEEE, Piscataway, NJ, USA, Sep. 24, 2010 (Sep. 24, 2010), pp. 574-578, XP031818163, ISBN: 978-1-4244-6851-5, * the whole document *.

* cited by examiner

QUERY LATENCY OF A DNS SERVICE

FIELD

The present disclosure relates generally to the systems and methods for resolution of domain names in a domain name system (DNS). More particularly, but not exclusively, the present disclosure relates to describing and/or improving query latency of a DNS service.

BACKGROUND

The domain name system (DNS) defines how Internet domain names are located and translated into IP addresses. Because maintaining a central list of domain name/IP address correspondences would be impractical, under DNS, the lists of domain names and IP addresses are distributed throughout the Internet in a hierarchy of authority. Accordingly, before a web page stored at a specified domain name can be accessed, the accessing device must first perform (or have previously performed) a DNS lookup operation to find the IP address corresponding to the domain name. DNS lookups can account for significant perceived latency when browsing the Internet. To enhance the Internet browsing experience, it is thus desirable to reduce latency caused by DNS lookups as much as possible.

SUMMARY

Embodiments of the present disclosure provide systems, methods, and computer-readable mediums provide for accessing a set of data related to a plurality of domain name system (DNS) requests for a transmitted via transport control protocol (TCP) for a plurality of subnets in a network; selecting a subset of the set of data that is a representative sample of the set of data; estimating latency of the subset of the data; estimating latency for the totality of the data regardless of protocol used (TCP or UDP); and modifying a portion of the network based on the estimated latency of the totality of the data.

According to some embodiments, the set of data includes round trip time of the plurality of DNS requests, a volume of traffic data for a plurality of sources in the network, and border gateway protocol (BGP) route data.

According to some embodiments, selecting the subset of data includes selecting a random sampling with replacement for a subnet of the plurality of subnets; determining a range of a median value for a predetermined confidence interval; and selecting the random sampling for the subnet as the representative sample of the set of data when the median value is less than a predetermined percentage of the median value.

According to some examples, estimating the latency of the subset of data comprises estimating the query latency if the service were anycasted.

According to some examples, acceptable latency for a peer group may be identified; and a plurality of sources for the peer group with latency that exceeds a threshold relative to other sources in the peer group may be identified and ranked.

Additional objects and advantages of the embodiments of the disclosure will be set forth in part in the description which follows, and in part will be obvious from the description, or may be learned by practice of the embodiments. The objects and advantages of the embodiments will be realized and attained by means of the elements and combinations particularly pointed out in the appended claims.

It is to be understood that both the foregoing general description and the following detailed description are exemplary and explanatory only and are not restrictive of the embodiments, as claimed.

BRIEF DESCRIPTION OF DRAWINGS

The foregoing summary as well as the following detailed description is better understood when read in conjunction with the appended drawing. For the purpose of illustrating the invention, the drawing details an exemplary constructions of the invention; however, the invention is not limited to the specific methods and systems disclosed herein. The figure shows a block diagram of an exemplary system, consistent with principles of the present disclosure.

DESCRIPTION OF EXEMPLARY EMBODIMENTS

Reference will now be made in detail to example embodiments, which are illustrated in the accompanying drawings. When appropriate, the same reference numbers are used throughout the drawings to refer to the same or like parts.

For simplicity and illustrative purposes, the principles of the present disclosure are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present disclosure. Moreover, in the following detailed description, references are made to the accompanying figures, which illustrate specific exemplary embodiments. Electrical, mechanical, logical and structural changes may be made to the exemplary embodiments without departing from the spirit and scope of the present disclosure. The following detailed description is, therefore, not to be taken in a limiting sense and the scope of the present disclosure is defined by the appended claims and their equivalents.

As noted above, DNS lookups can account for significant perceived latency when browsing the Internet. To enhance the Internet browsing experience, it is thus desirable to reduce latency caused by DNS lookups as much as possible.

However, most of the DNS requests are transmitted via User Datagram Protocol (UDP). UDP is a stateless protocol that is not connection oriented and does not utilize acknowledgements. Thus, the UDP protocol does not allow for the recipient of the DNS request (the operator of the authoritative DNS service for example) to calculate a transmit time that represents the time it takes for a request to travel from a point A to a point B in a network.

A small percentage of the DNS requests are transmitted via Transport Communication Protocol (TCP). TCP protocol is a state-full, connection-oriented protocol. Latency for TCP communications from one node to a DNS service at a node in a network can be calculated. Further, round trip time (RTT) latency can be calculated during session buildup and teardown. As discussed herein, the latency of at least some of the DNS requests that are transmitted via TCP may used to describe the latency of all of the queries, including those transmitted via UDP.

Embodiments of the present disclosure provide systems, methods, and computer-readable mediums provide for accessing a set of data related to a plurality of domain name system (DNS) requests for a transmitted via transport control protocol (TCP) for a plurality of subnets in a network; selecting a subset of the set of data that is a representative sample of the set of data; estimating latency of the subset of the data; and modifying a portion of the network based on the estimated latency of the subset of the data.

Figure 1:
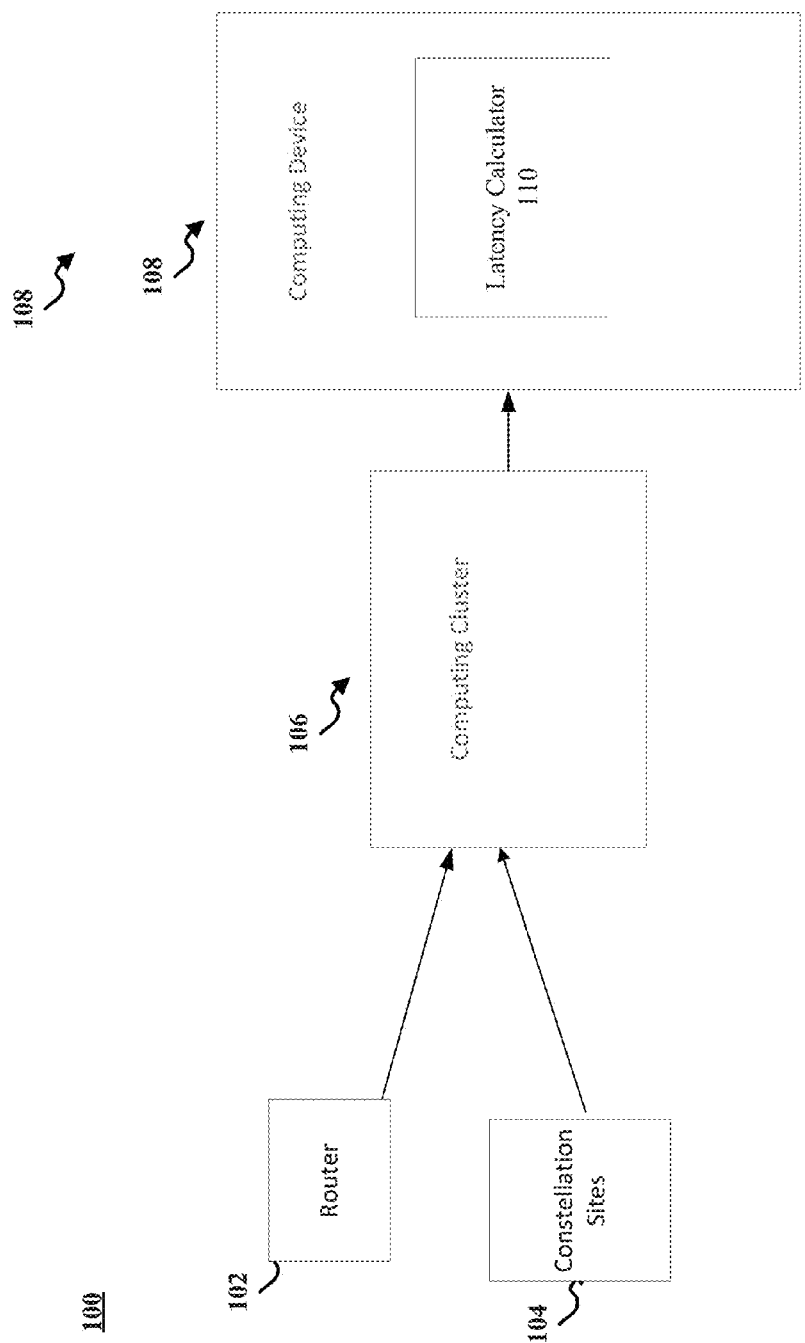
FIG. 1 shows an example system environment, according to some embodiments.

FIG. 1 is an example diagram of a networked system environment 100 for implementing features in accordance with the present disclosure. As shown in FIG. 1, system environment 100 includes one or more routers 102 that provide routing table data to computing cluster 106. Computing cluster 106 may be implemented, for example, as a Hadoop framework for processing large amounts of data.

System environment 100 may further include one or more constellation sites 104. Constellation sites 104 may be implemented as one or more nodes that collect DNS request TCP data and transmit the data to computing cluster 106. Computing cluster 106 may collect and process the routing table data from the one or more routers 102 and the DNS TCP data from the one or more constellation sites 104 as more fully discussed herein. The data that is processed by the computing cluster 106 may be transmitted to computing device 108.

Computing device 108 may be implemented as, for example, a gateway device that receives the processed data from the computing cluster 106 and includes latency calculator 110 that calculates latency based on the data, as more fully discussed herein.

Figure 2:
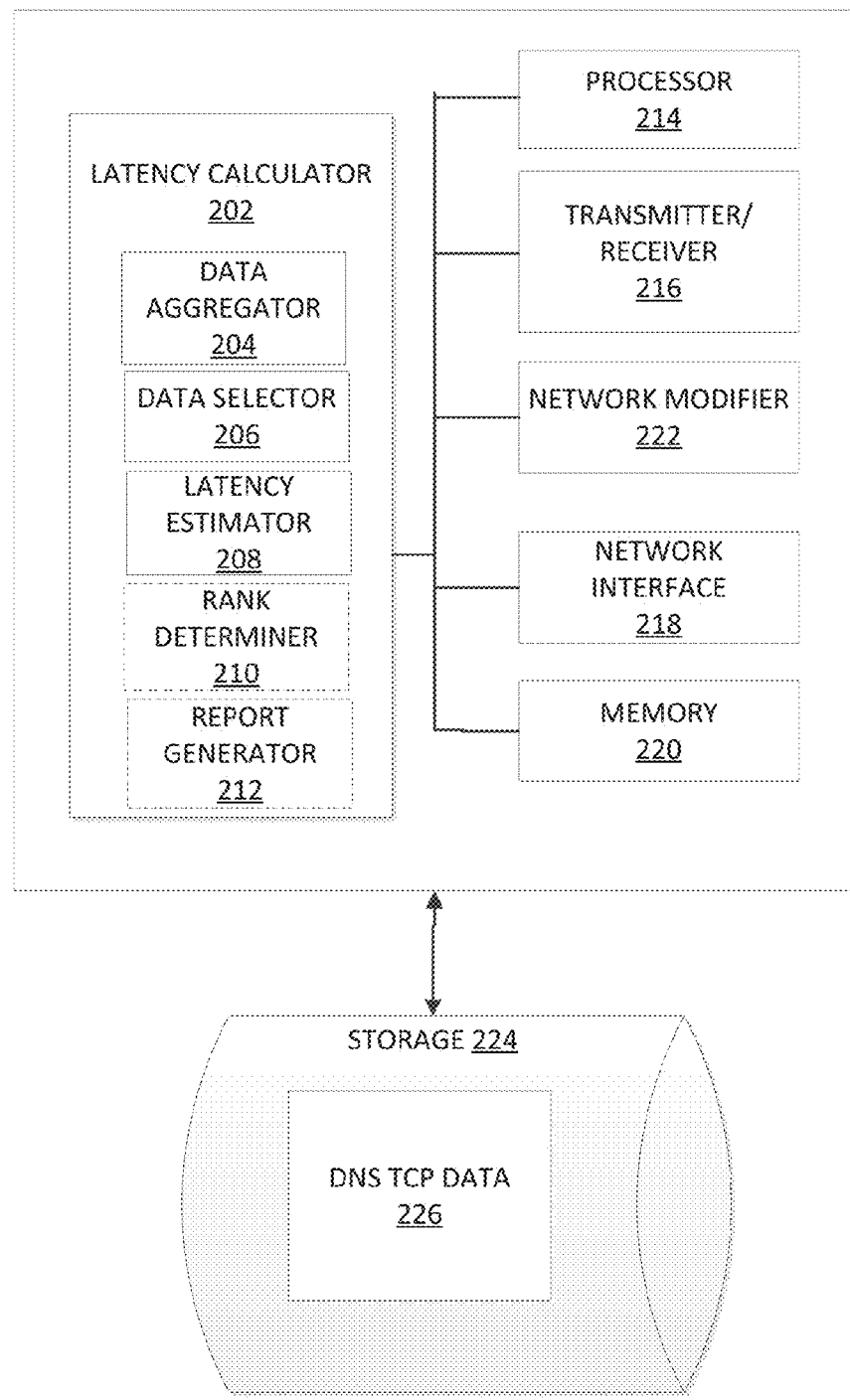
FIG. 2 shows an example block diagram of a computing device according to embodiments.

FIG. 2 is a block diagram of a computing device 200 for calculating latency in accordance with principles as discussed herein. Computing device 200 may be implemented as computing device 108 depicted in FIG. 1. FIG. 1 includes latency calculator 202. Latency calculator 202 includes data aggregator 204. Data aggregator 204 aggregates the DNS TCP data collected from the one or more routers 102 and the one or more constellation sites 106. The data is aggregated based on a number of assumptions including one or more of the following:

unit of granularity is the following triple: IP/24-Country-Site (IP/24 within a specific Country going to a specific site), and all DNS queries for a given day from a select IP/24-Country-Site have the same latency value which is the median latency of the IP/24-Country-Site.

Based on these one or more assumptions, using the TCP RTT data for a single IP address in an IP/24 subnet, a median latency is calculated across all IPs in the /24 subnet and the single latency value, the calculated median value, is assigned to all IPs in the /24 in the same country.

The latency information from /24 from country to site is joined with the volume data such that the total number of queries from each /24 on day for each country and site/country/site is assigned the same median latency value.

The BGP routing data is further joined with the RTT data and the volume data in order to associate the routing path for each IP.

Latency calculator 202 further includes data selector 206. Once the data is aggregated by data aggregator 204, the data selector analyzes the data in order to select one or more subsets of the data that is statistically relevant. In other words, for each specific IP/24, the data is analyzed to determine if there are a sufficient number of measurements to make statistically valid conclusions. In order to determine if there are a sufficient number of measurements, data selector 206 may perform a statistical bootstrapping process that takes random samples with replacement for each IP/24. The process may be repeated a predetermined number of times in order to determine a range (interval) of median value for a predetermined confidence.

For example, the sampling with replacement, for each IP/24, may be repeated 100 times to determine the range (interval) of median value for 95% confidence. In this example, a calculated median is 72.54, then 95% confidence range is [71.22, 75.66].

The median value may be trusted if the interval is less than a predetermined threshold value, for example, 5% of the median. In the example above, (75.66−71.22)/72.54=0.0612.

In accordance with some embodiments, this may be determined by analyzing a percentage of values within a predetermined number of standard deviations of the mean, by utilizing a ratio of standard deviation to the mean, etc. Based on these values, it may be determined how tight the distribution is. If the distribution is wide, then it may be determined that there are not enough RTT values to be statistically relevant, or that a single median daily latency value cannot be accurately associated with all the IP/32's in the IP/24.

If the distribution is tight, then it may be determined that there are a sufficient number of values to be statistically relevant and a single median daily latency value cannot be accurately associated with all the IP/32's in the IP/24.

If it is determined that the data is statistically relevant, it may be appreciated that the distribution of latency data does not map the distribution of the traffic that is observed. In other words, global and site views may be affected by country skew. To accommodate for the country skew, volume of traffic from each country to a specific site is normalized over the total amount of data in order to draw conclusions of the overall service.

For example, latency may be different for each country, and as a result high or low latencies may be over counted because said deviant latency values from specific geographies may be over-represented in the data. Thus, an adjustment may be made to counterbalance the country skew by normalizing the data to map to the distribution. For example, the data selector 206 may use respective ratios in query data and adjusted data. An adjustment factor may be defined per country such that $QueryRatio_{Adjusted} = QueryRatio_{QueryData} \times AdjustementFactor_{Country}$. The query count of each source may be adjusted by its country's adjustment factor. The same adjustment can be performed for a Country/Site combination, i.e, the ratio of traffic from a Country to a specific network site.

Latency calculator 202 further includes latency estimator 208. Latency estimator 208 estimates the latency across one or more dimensions including source geographic location, destination location and source continent location by aggregating across each set of one or more dimensions by taking the median value adjusted by query volume (weighted median).

Having generated the median daily latency (hereafter Median_Latency) for each unique grouping of IP/24, Country, Site, i.e., having derived tuples of the form IP/24, Country, Site, Median_Latency, and enhanced the above data with the AS (Autonomous System) that the IP/24 maps to (hereafter Origin_AS), and the closest hop AS from the BGP route data (hereafter Clostes_AS) and additional geo-location info such as City, State (or District), longitude and latitude, and having associated the day's query volume for each IP/24, Country, Site, and having adjusted said query volume so that the volume of each unique IP/24, Country, Site to counter country skew, or country-site skew, unique groupings can be derived. The unique groupings can be in the form of IP/24, Country, Site, Median_Latency, Adjusted_Query_Volume, Origin_AS, Closest_AS, City, State or District, Longitude and Latitude.

From the above the weighted median can be calculated for any (or any combination of) of the following: Country, Site, Origina_AS, Closest_AS, City, State or District, Longitude and Latitude, where Adjusted_Query_Volume is the weight for the weighted median calculation.

Instead of the weighted median, the weighted mean, the weighted 95th percentile or any other percentile value or any other weighted moment of the distribution of Median_Latency can be derived across any (or any combination of) of the following: Country, Site, Origin_AS, Closest_AS, City, State or District, Longitude and Latitude.

Since these calculation can be performed daily, or hourly, or at other desired fixed interval, the weighted median latency can be derived of any (or any combination of) of the following Country, Site, Origin_AS, Closest_AS, City, State or District, Longitude and Latitude and track it over time so that changes and fluctuations can be observed over time, especially as it relates to network events (Internet outages, global changes in routing, congestion, attacks) and actions of the operator, such as installation of new sites, adding/removing peering relationships, changes in BGP routes and their advertisements, etc.

The latency estimator 208 may further estimate latency if the service were to be anycasted by performing predictive modeling and assumed that all traffic from a country is only transmitted to one of a predetermined number of sites with the lowest latency for the country and is proportionally divided to only those predetermined number of sites.

The latency estimator 208 may further estimate the latency for a peer group. A peer group may be all of the IP/24 from the same country and site. The latency may be determined by using a bagged clustering algorithm where a partitioning cluster algorithm (e.g., kmeans) is run repeatedly on bootstrap samples from the original data. The resulting cluster centers are combined with hierarchical clustering. The bagged clustering eliminates the problem of initial centroids of k-means and lends some robustness to the clustering.

The bagged clustering is run in combination, or inside another algorithm. For each site and country pair, values in a predetermined percentile are considered, for example, 95%. Further IP/24s with DNS query counts above a percentile threshold, for example 10%, are considered. Further, the country/site pair is considered if at least a predetermined number of values (for example, 35, 40, etc.,) exist.

The algorithm then proceeds to try to find a predetermined number of clusters, for example 4, and returns the highest value of the biggest cluster, if:

the threshold is bigger than a predetermined percentage of the values, for example 50%, the biggest cluster includes more than a predetermined percentage of the values, for example, 40%.

If either criterion is not met, then the predetermined number of clusters is continually reduced by 1 and the algorithm proceeds to try to find the new predetermined number of clusters.

If only two clusters can be determined, then the first cluster is returned if it contains >a predetermined percentage of values, for example 25%.

If all fails, then a predetermined percentile value may be returned, for example, $95^{th}$ percentile value.

Once peer group is determined, the rank determiner 210 may identify and rank a plurality of sources for the peer group with latency that exceeds a threshold relative to other sources in the peer group. This may be performed by determining what an acceptable latency threshold for the peer group by calculated a measure of laggardness for a specific /24 to determine what an acceptable deviant is, for example, how abnormal it is relative to its peer group.

To determine the measure of laggardness, the following is determined:

$(\log_{10}(\text{Query Count}) - \log_{10}(\text{Query Threshold})) * \text{Multiple of cutoff}$ Where multiple of cutoff is >1

Using query threshold—100,000

For example, if 1.2.3.4 from Greece sends 10,000,000 ($10^7$ queries to ams1 with a median latency of 45 ms and the Greece-ams1 "cutoff" is 30 ms, the "multiple of cutoff is 45/30=1.5.

The laggardness value is $(\log_{10}(10^7) - \log_{10}(10^5)) * 1.5 = 3$

Laggardness for hops (AS's) is a volume weighted mean of its contributing values.

Latency calculator 202 may further include report generator 212*d* that generates reports in the form of charts and visualizations. The derived measurements, charts and visualizations provide a longitudinal view of weighted median latency (hereafter referred to as latency) across multiple services operated by the service operator, countries, origin Autonomous Systems, last hop Autonomous Systems, geographic locations, IP's and IP subnets (such as IP/24). The views of latency enable automated and human-assisted efforts to improve latency (lower latency is an improvement) and reduce the network distance that traffic has to travel in the network before being responded to by the operator's servers (shorter travel distance is directly related to lower latency).

Actions that can improve latency include:

Identify geographic locations to place resolution sites (servers) in order to improve latency by examining the longitudinal latencies of specific countries, continents, finer grained geographic locations Identify sources (clients) of high latency relative to their peers and associated BGP paths, so that issues with routing can be determined and fixed by modifying (adding, removing) the advertisement of specific routing announcement from specific locations Identify origin AS's with consistently high latency so that new desired peering relationships can identified and enabled in specific network locations Identify last hop AS's with consistently high latency so that new desired peering relationships can identified and enabled in specific network locations.

For all of the above, the longitudinal tracking of latency by country, closest hop AS, origin AS, geographic location, IP, IP/24, etc. is used to measure change following action such as the ones described above and evaluate the effect of corrective action.

Also, the longitudinal tracking of latency by country, closest hop AS, origin AS, geographic location, IP, IP/24, etc., is used to measure the effect on latency of external events that are not the result of actions by the operator on the operator-controlled infrastructure, such as Internet outages, global routing changes, attacks, congestion, etc.

In the described embodiment latencies are obtained with a passive measurement approach.

In the architecture of client and server, passive measurement means that you attempt to measure at the server side. Active measurement means that clients are designated as probes and can measure directly the network latency from the client's perspective. In the case of the discussed passive measurement the client's network latency is inferred from the server's perspective (TCP-RTT).

In an alternative embodiment the raw latency measurements (TCP-RTT) can be obtained with an active measurement approach. The further processing, aggregation, joining and weighing of the raw latency measurements would be the same.

FIGS. 3A-D depicts example reports or visualizations in accordance with the principles as discussed herein.

Figure 3A:
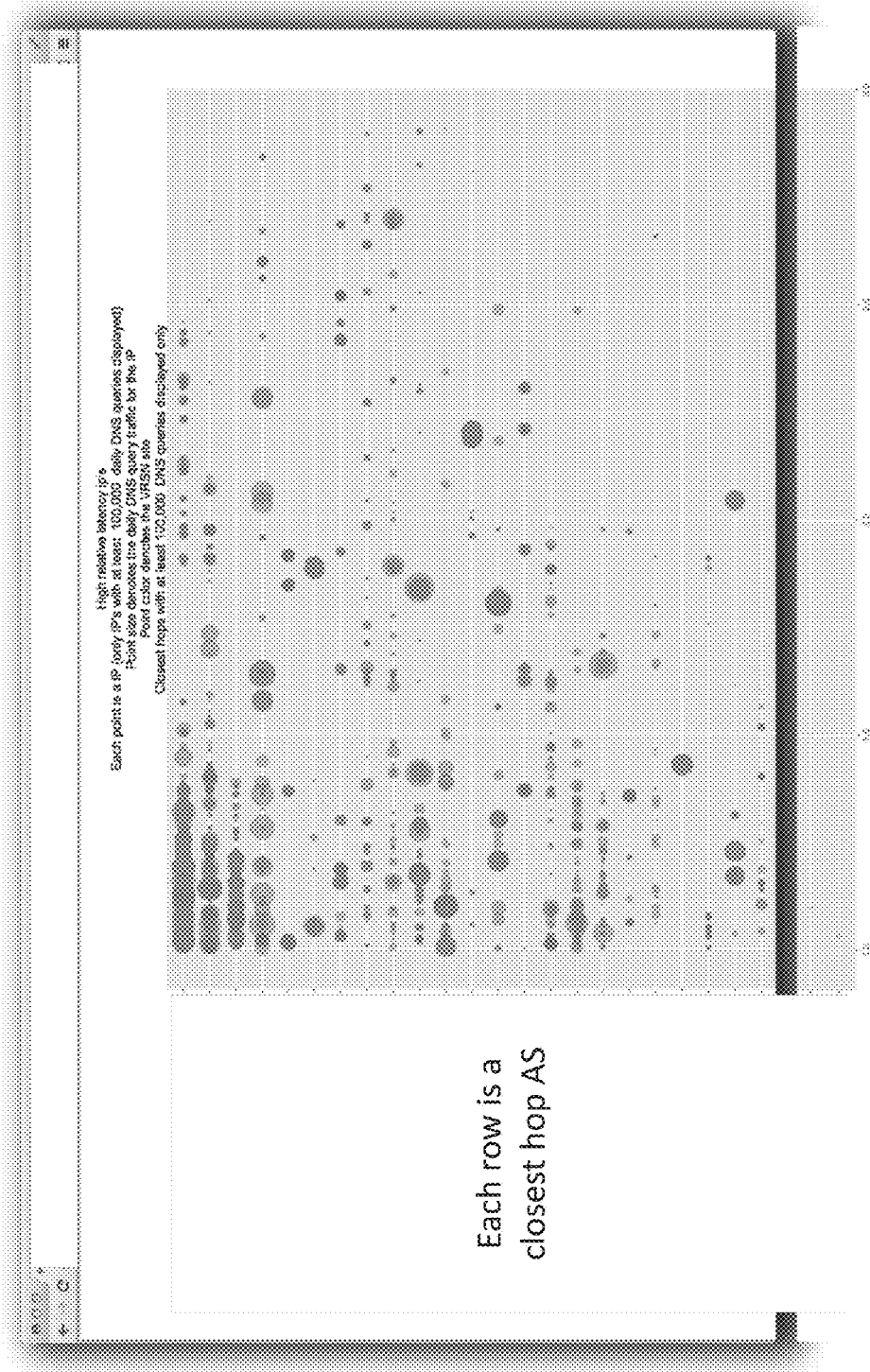
FIGS. 3A-3D show examples of reports or visualizations, according to embodiments.
Figure 3B:
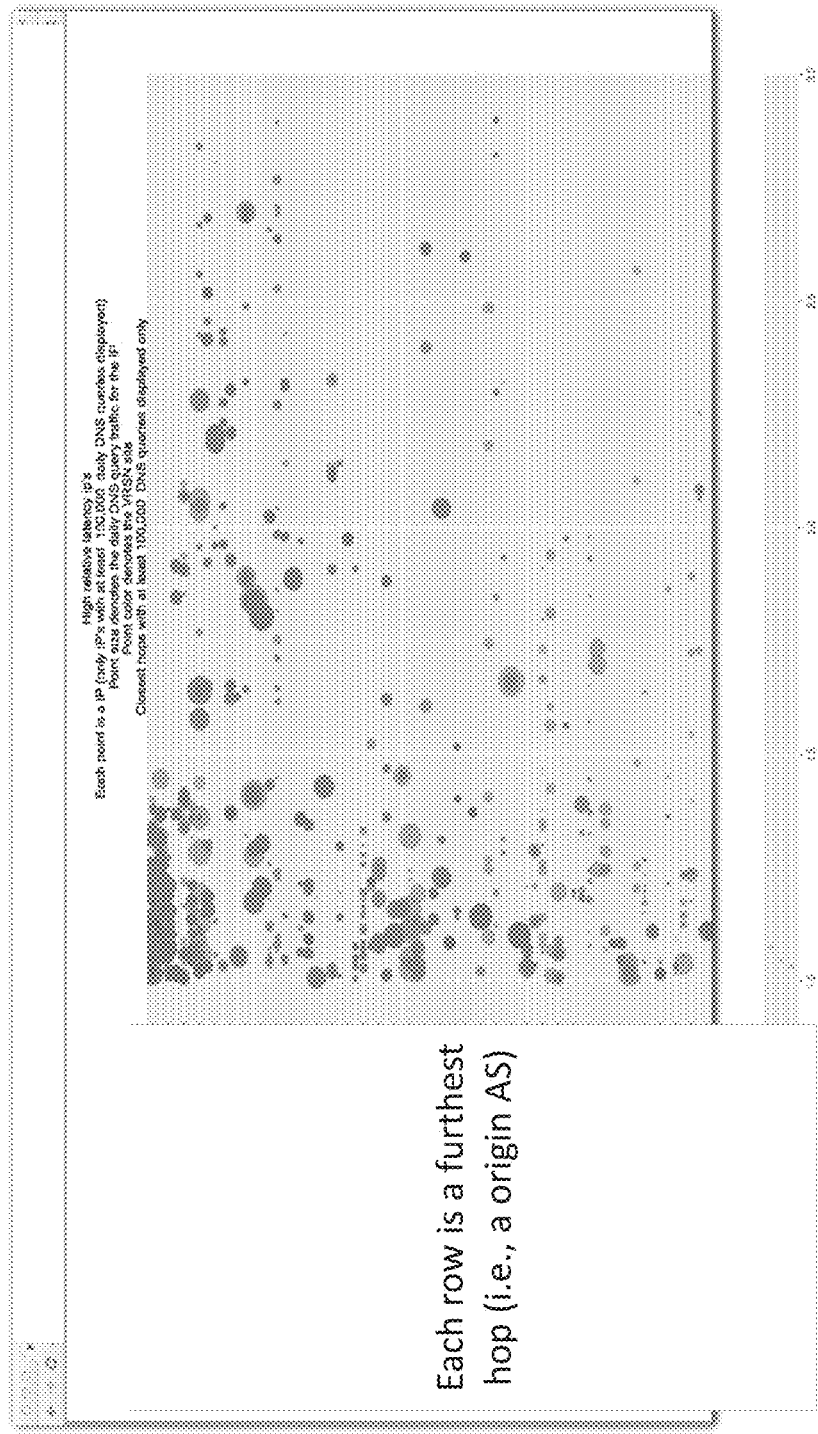
Figure 3C:
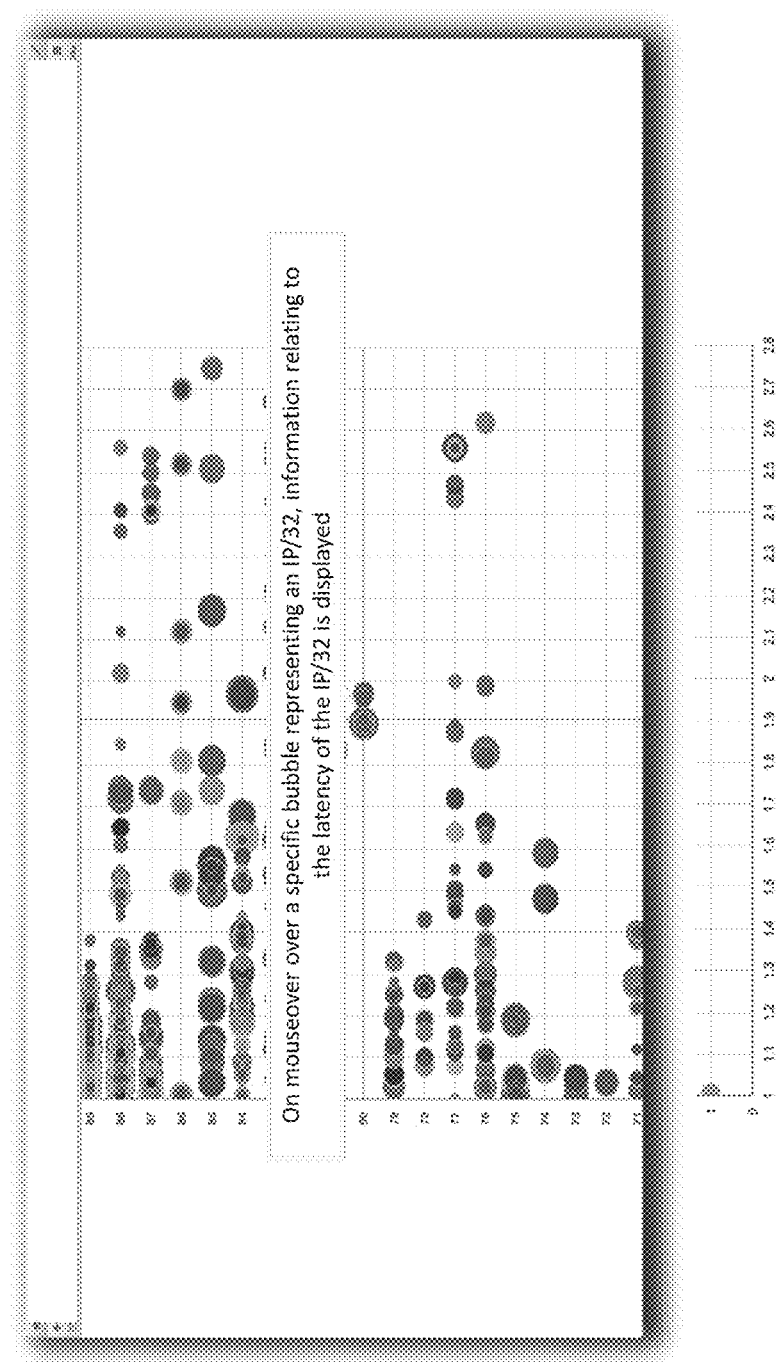
Figure 3D:
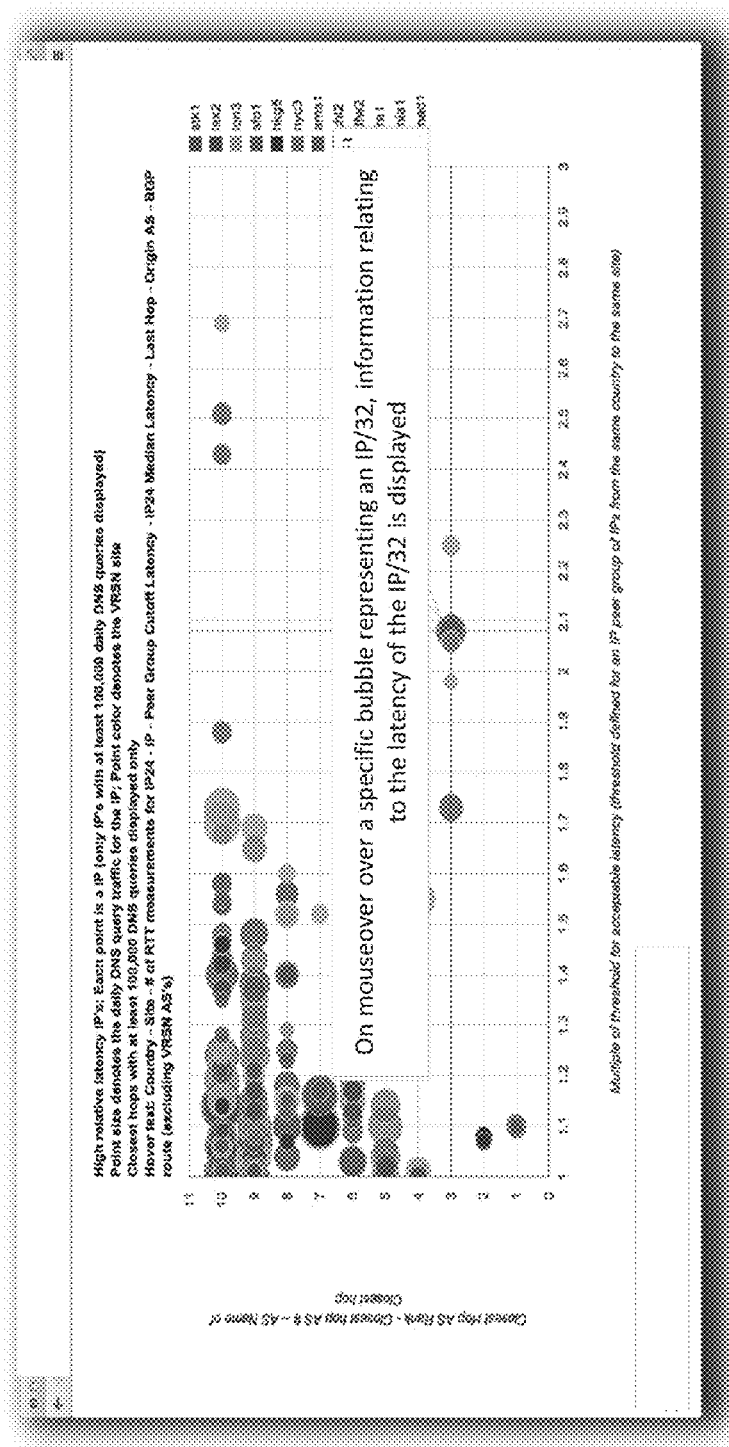

The report depicted in FIG. 3A is a report that depicts high relative latency IPs where each point is an IP, where only IPs with at least 100,000 daily DNS queries are displayed. The point size denotes the daily DNS query traffic for the IP. The point color denotes the operator site. IP's with at least 100,000 DNS queries are displayed only. Each row is a closest hop AS, meaning all the IP's in the same row reach an operator's site through the same last hop AS. FIG. 3B is a report that depicts high relative latency IPs where each point is an IP, where only IPs with at least 100,000 daily DNS queries are displayed. The point size denotes the daily DNS query traffic for the IP. The point color denotes the operator site. IP's with at least 100,000 DNS queries are displayed only. Each row is a furthest hop AS. FIG. 3C depicts a closest hop report that may be interactive such that when a mouseover event occurs over a portion of the report, a popup is displayed. FIG. 3D depicts an interactive report of a country specific view of closest hops. The reports depicted in FIGS. 3A-3D are generated by organizing the data of the high latency clients (relative to their peers) so that each row represents a single closest hop AS, origin AS, closest hop AS and country respectively. with the details per IP. Further, the furthest hop AS's (aka origin AS) and the countries or closest hop AS's (in the other report variants) are ordered top to bottom in terms of severity. The severity, for example, of the origin AS is the sum of the laggardness values of all the IP's or IP/24's from the same AS (the bubbles in the same row). The same is true for the country and furthest hop AS. Further, the interactive versions of the reports may be used to identify and correct the behavior of a specific IP or IP/24 where as the overall view (what is displayed in FIG. 3A) is a snapshot of a global picture to identify origin AS's, closest hop AS's and countries that require attention in terms of high latency (that is why they are ordered top to bottom in terms of severity). It may be appreciated that there are other kinds of reports that could be included there, such as the geomaps that use a color scale to illustrate the magnitude of latency for a specific country. It may also be appreciated that dashboards of time series of values of latency per country, origin AS, closest hop AS, site, service may be utilized.

Computing device 200 may further include processor 214 to execute machine-readable code in the form of program instructions to perform the functionality discussed with regard to the latency calculator 202 including data aggregator 204, data selector 206, latency estimator 208, rank determiner 210, and report generator 212, in additional to the methods and functionality as discussed herein. Computing device 200 may further include a transmitter/receiver 216 to transmit and receive data from other devices within a networked, computing system environment 100. Computing device 200 may further include network interface 218 to facilitate communication with other devices within a networked, computing system environment.

Computing device 200 may further include memory 220. The memory 214 may be any device capable of storing electronic information, such as RAM, flash memory, a hard disk, an internal or external database, etc. The memory can be implemented as a non-transitory storage medium to store instructions adapted to be executed by the processor(s) to perform at least part of the method in accordance with certain embodiments. For example, the memory can store computer program instructions, for example, computer-readable or machine-readable instructions, adapted to be executed on the processor(s), to determine latency as discussed herein.

Computing device 200 may further include, or be communicably linked to storage 224 that includes DNS TCP data 226.

Figure 4:
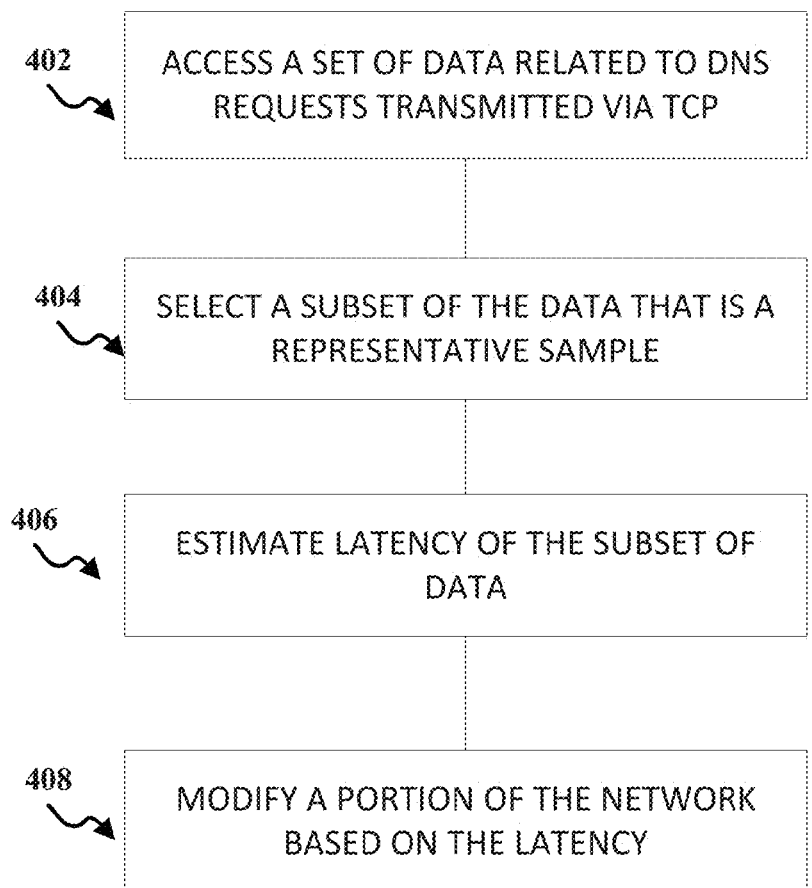
FIG. 4 shows an example process for estimating latency, according to embodiments.

FIG. 4 depicts an example flow diagram of a process 700 for estimating latency in accordance with some embodiments discussed herein. The process depicted in FIG. 4 may be performed by computing device 200 depicted in FIG. 2 or computing device 108 depicted in FIG. 1. As shown in FIG. 4, at block 402, a set of data related to a plurality of domain name system (DNS) requests for a transmitted via transport control protocol (TCP) for a plurality of subnets in a network is accessed. At block 404, a subset of the set of data that is a representative sample of the set of data is selected. At block 406, latency of the subset of the data is estimated. At block 408, a portion of the network is modified based on the estimated latency of the subset of the data.

According to some embodiments, the set of data includes round trip time of the plurality of DNS requests, a volume of traffic data for a plurality of sources in the network, and border gateway protocol (BGP) route data.

According to some embodiments, selecting the subset of data includes selecting a random sampling with replacement for a subnet of the plurality of subnets; determining a range of a median value for a predetermined confidence interval; and selecting the random sampling for the subnet as the representative sample of the set of data when the median value is less than a predetermined percentage of the median value.

According to some embodiments, estimating the latency of the subset of data includes estimating the query latency if the service were anycasted.

According to some embodiments, estimating latency of the subset of data includes estimating the query latency across at least two of source geographic location, destination location, and source continent location.

According to some embodiments, acceptable latency for a peer group is identified; and a plurality of sources for the peer group with latency that exceeds a threshold relative to other sources in the peer group are identified and ranked.

Figure 5:
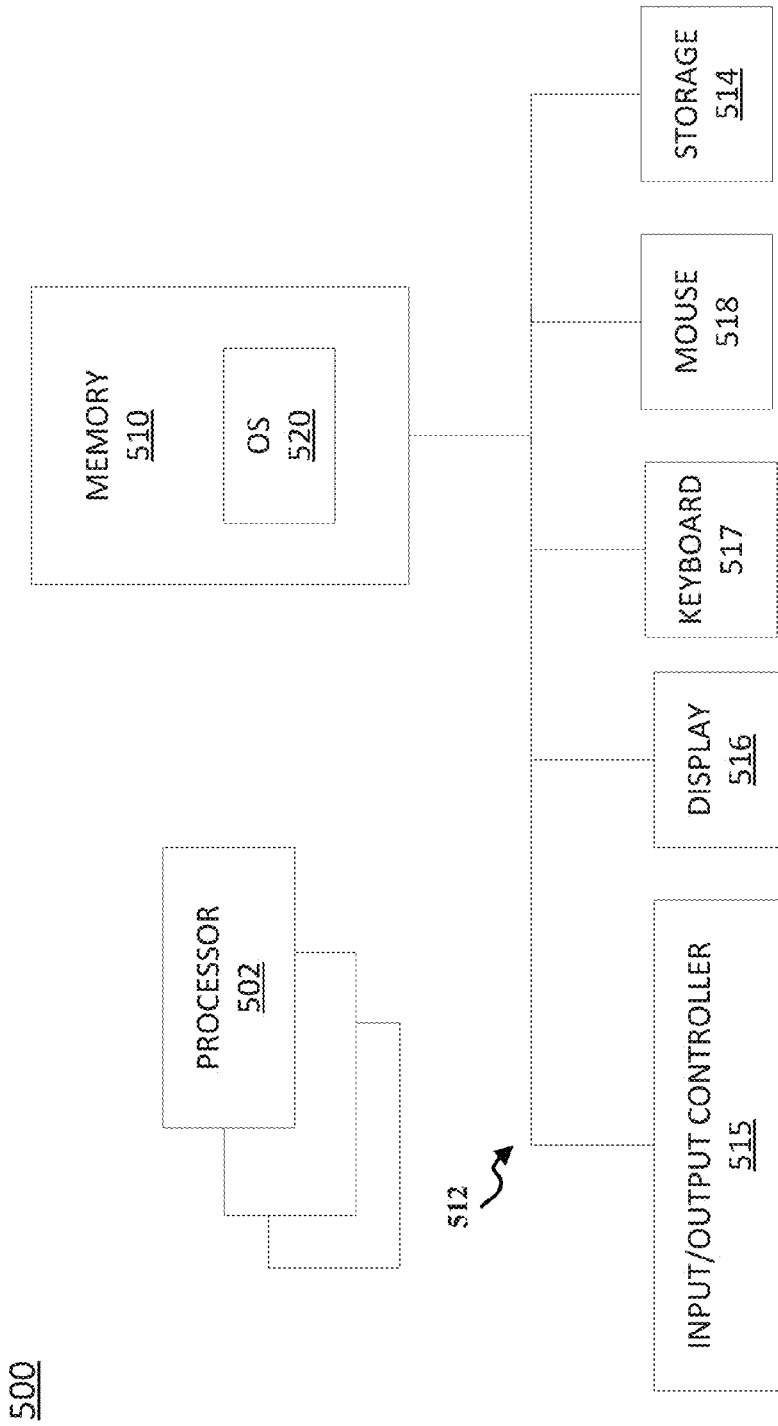
FIG. 5 shows an example computer system according to embodiments.

FIG. 5 illustrates a computer system 500 that is consistent with embodiments of the present disclosure. It may be appreciated that according to some embodiments, one or more components, as discussed herein, may be located on a node, device, agent, system, etc., that is different from a node, device, agent, system, etc., that includes another one or more components. For example, the detector as discussed herein, may be located at a different node, device, agent, system, etc., than the node, device, agent, system, etc., that includes the latency calculator as discussed herein.

In general, embodiments of a latency estimation system may be implemented in various computer systems, such as a gateway network device, a server, a workstation, an embedded system, a multifunction device, a distributed system, a combination thereof, etc. The computer program may exist in a variety of forms both active and inactive. For example, the computer program can exist as software program(s) comprised of program instructions in source code, object code, executable code or other formats; firmware program(s); or hardware description language ("HDL") files. Any of the above, including the latency calculator, can be embodied on a non-transitory computer readable medium, which include storage devices, in compressed or uncompressed form. However, for purposes of explanation, system 500 is shown as a general purpose computer that is well known to those skilled in the art. Examples of the components that may be included in system 500 will now be described.

As shown, system 500 may include at least one processor 502, a keyboard 517, a pointing device 518 (e.g., a mouse, a touchpad, and the like), a display 516, main memory 510, an input/output controller 515, and a storage device 514. Storage device 514 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. A copy of the computer program embodiment of the printer driver can be stored on, for example, storage device 514. System 500 may also be provided with additional input/output devices, such as a printer (not shown). The various components of system 500 communicate through a system bus 512 or similar architecture. In addition, system 500 may include an operating system (OS) 520 that resides in memory 510 during operation. One skilled in the art will recognize that system 500 may include multiple processors 502. For example, system 500 may include multiple copies of the same processor. Alternatively, system 500 may include a heterogeneous mix of various types of processors. For example, system 500 may use one processor as a primary processor and other processors as co-processors. For another example, system 500 may include one or more multi-core processors and one or more single core processors. Thus, system 500 may include any number of execution cores across a set of processors (e.g., processor 502). As to keyboard 517, pointing device 518, and display 516, these components may be implemented using components that are well known to those skilled in the art. One skilled in the art will also recognize that other components and peripherals may be included in system Main memory 510 serves as a primary storage area of system 500 and holds data that is actively used by applications, such as the printer driver in the barcode printing system, running on processor 502. One skilled in the art will recognize that applications are software programs that each contains a set of computer instructions for instructing system 500 to perform a set of specific tasks during runtime, and that the term "applications" may be used interchangeably with application software, application programs, device drivers, and/or programs in accordance with embodiments of the present teachings. Memory 510 may be implemented as a random access memory or other forms of memory as described below, which are well known to those skilled in the art.

OS 520 is an integrated collection of routines and instructions that are responsible for the direct control and management of hardware in system 500 and system operations. Additionally, OS 520 provides a foundation upon which to run application software and device drivers. For example, OS 520 may perform services, such as resource allocation, scheduling, input/output control, and memory management. OS 520 may be predominantly software, but may also contain partial or complete hardware implementations and firmware. Well known examples of operating systems that are consistent with the principles of the present teachings include MICROSOFT WINDOWS (e.g., WINDOWS CE, WINDOWS NT, WINDOWS 2000, WINDOWS XP, and WINDOWS VISTA), MAC OS, LINUX, UNIX, ORACLE SOLARIS, OPEN VMS, and IBM AIX.

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., processor 502), an application specific integrated circuit, a field programmable gate array or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a microprocessor, a plurality of microprocessors, or any other such configuration.

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions may be stored on or transmitted over a computer-readable medium as one or more instructions or code. Computer-readable media includes both tangible, non-transitory computer storage media and communication media including any medium that facilitates transfer of a computer program from one place to another. A storage media may be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Resources described as singular or integrated can in one embodiment be plural or distributed, and resources described as multiple or distributed can in embodiments be combined. The scope of the present teachings is accordingly intended to be limited only by the following claims. Although the systems herein has been described with respect to specific embodiments, those skilled in the art will recognize that numerous modifications are possible. In addition, embodiments of the present disclosure can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

The following description is illustrative of embodiments in accordance with aspects of the invention. It is understood that variations in configuration and of the illustrative embodiments may occur to persons skilled in the art.

What is claimed is:

1. A computer-implemented method, comprising:
accessing a set of data related to a plurality of domain name system (DNS) requests transmitted via transport control protocol (TCP) for a plurality of subnets in a network;
selecting a subset of the set of data that is a representative sample of the set of data;
estimating latency of the subset of the data for the set of all data; and
modifying a portion of the network based on the estimated latency of the subset of the data.

2. The computer-implemented method of claim 1, wherein the set of data includes round trip time of the plurality of DNS requests, a volume of traffic data for a plurality of sources in the network, and border gateway protocol (BGP) route data.

3. The computer-implemented method of claim 1, wherein selecting the subset of data comprises:
selecting a random sampling with replacement for a subnet of the plurality of subnets;
determining a range of a median value for a predetermined confidence interval; and
selecting the random sampling for the subnet as the representative sample of the set of data when the median value is less than a predetermined percentage of the median value.

4. The computer-implemented method of claim 1, wherein estimating the latency of the subset of data comprises estimating the query latency if the service were anycasted.

5. The computer-implemented method of claim 1, further comprising:

identifying acceptable latency for a peer group;
identifying and ranking a plurality of sources for the peer group with latency that exceeds a threshold relative to other sources in the peer group; and
generating and displaying a report presenting high latency sources to identify systemic patterns of high latency.

6. An apparatus, comprising:
a memory, storing a set of instructions;
a processor, configured to execute the stored set of instructions to perform a method comprising:
accessing a set of data related to a plurality of domain name system (DNS) requests transmitted via transport control protocol (TCP) for a plurality of subnets in a network;
selecting a subset of the set of data that is a representative sample of the set of data;
estimating latency of the subset of the data for the set of all data; and
modifying a portion of the network based on the estimated latency of the subset of the data.

7. The apparatus of claim 6, wherein the set of data includes round trip time of the plurality of DNS requests, a volume of traffic data for a plurality of sources in the network, and border gateway protocol (BGP) route data.

8. The apparatus of claim 6, wherein selecting the subset of data comprises:
selecting a random sampling with replacement for a subnet of the plurality of subnets;
determining a range of a median value for a predetermined confidence interval; and
selecting the random sampling for the subnet as the representative sample of the set of data when the median value is less than a predetermined percentage of the median value.

9. The apparatus of claim 6, wherein estimating the latency of the subset of data comprises estimating the query latency if the service were anycasted.

10. The apparatus of claim 6, the method further comprising:
identifying acceptable latency for a peer group;
identifying and ranking a plurality of sources for the peer group with latency that exceeds a threshold relative to other sources in the peer group; and
generating and displaying a report presenting high latency sources to identify systemic patterns of high latency.

11. A non-transitory computer-readable medium, storing a set of instructions executable by a processor to perform a method, comprising:
accessing a set of data related to a plurality of domain name system (DNS) requests transmitted via transport control protocol (TCP) for a plurality of subnets in a network;
selecting a subset of the set of data that is a representative sample of the set of data;
estimating latency of the subset of the data for the set of all data; and
modifying a portion of the network based on the estimated latency of the subset of the data.

12. The non-transitory computer-readable medium of claim 11, wherein the set of data includes round trip time of the plurality of DNS requests, a volume of traffic data for a plurality of sources in the network, and border gateway protocol (BGP) route data.

13. The non-transitory computer-readable medium of claim 11, wherein selecting the subset of data comprises:
selecting a random sampling with replacement for a subnet of the plurality of subnets;

determining a range of a median value for a predetermined confidence interval; and
selecting the random sampling for the subnet as the representative sample of the set of data when the median value is less than a predetermined percentage of the median value.

14. The non-transitory computer-readable medium of claim 11, wherein estimating the latency of the subset of data comprises estimating the query latency if the service were anycasted.

15. The non-transitory computer-readable medium of claim 11, the method further comprising:
identifying acceptable latency for a peer group;
identifying and ranking a plurality of sources for the peer group with latency that exceeds a threshold relative to other sources in the peer group; and
generating and displaying a report presenting high latency sources to identify systemic patterns of high latency.

* * * * *